United States Patent [19]

Geldner et al.

[11] 4,271,372

[45] Jun. 2, 1981

[54] ROTATABLE ANODE FOR AN X-RAY TUBE COMPOSED OF A COATED, POROUS BODY

[75] Inventors: Ernst Geldner, Rosstal; Rudolf Friedel, Kleinseebach; Klaus Haberrecker, Neunkirchen, all of Fed. Rep. of Germany

[73] Assignee: Siemens Aktiengesellschaft, Berlin & Munich, Fed. Rep. of Germany

[21] Appl. No.: 777,916

[22] Filed: Mar. 16, 1977

[30] Foreign Application Priority Data

Apr. 26, 1976 [DE] Fed. Rep. of Germany ....... 2618235

[51] Int. Cl.[3] ...................... H01J 35/08; H01J 35/04; B32B 3/26

[52] U.S. Cl. ...................................... 313/330; 313/60; 428/316; 428/408

[58] Field of Search ......................... 313/330, 60, 311; 428/316, 408

[56] References Cited

U.S. PATENT DOCUMENTS

| | | | |
|---|---|---|---|
| 2,863,083 | 12/1958 | Schram | 313/330 |
| 3,959,685 | 5/1976 | Konieczynski | 313/60 X |
| 3,969,131 | 7/1976 | Fatzer et al. | 313/330 X |

OTHER PUBLICATIONS

French Application #73.06485, Available to Public 9/20/74; 13 pp., Rene Lignon; ICIREPAT No. 2.219.133.

*Primary Examiner*—Alfred E. Smith

*Attorney, Agent, or Firm*—Hill, Van Santen, Steadman, Chiara & Simpson

[57] ABSTRACT

A rotatable anode for an X-ray tube comprising a body composed of a porous, difficult to melt material enclosed in a sealed fashion within an enveloping layer of a difficult to melt material, characterized by the porous body being of a material having a good thermal conductivity and a good thermal capacity and said porous body having its pores filled with a material having a good thermal conductance and being a good conductor of heat. The porous body is preferably a sintered porous body. The material of the porous body as well as the material of the enclosing layer are selected from a group consisting of tungsten, molybdenum, niobium, chromium, vanadium, titanium, carbon, alloys of these materials, and compounds of these materials. The filler material is preferably a metal selected from a group consisting of silver, gold, copper, aluminum, and alloys of these elements containing not less than a predominant proportion of at least one of these metals. The enveloping layer may be in the form of a sheet material container and lid which are tightly sealed together such as by welding or may be formed of a layer or coating of a portion of the porous body which layer or coating is tightly sealed to a sheet metal portion such as a lid.

6 Claims, 4 Drawing Figures

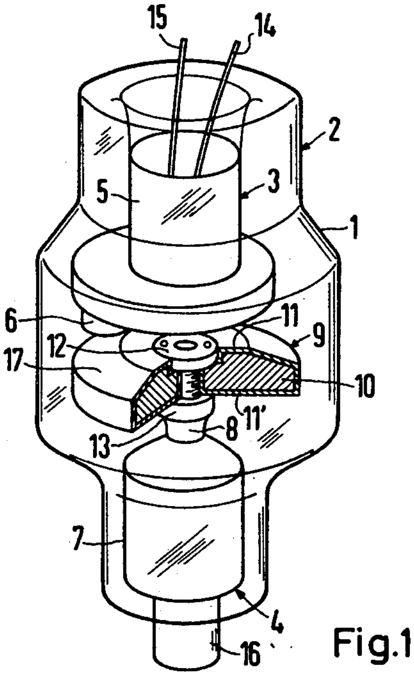
Fig.1
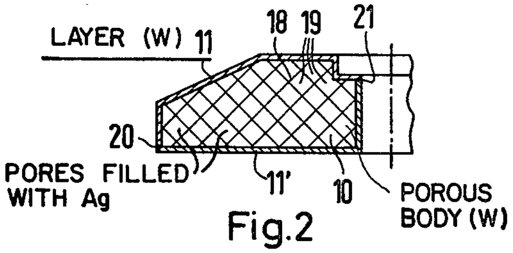
Fig.2
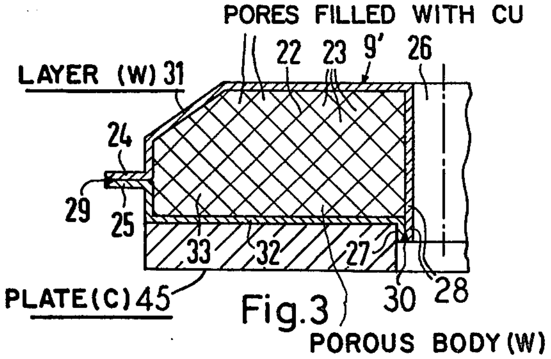
Fig.3
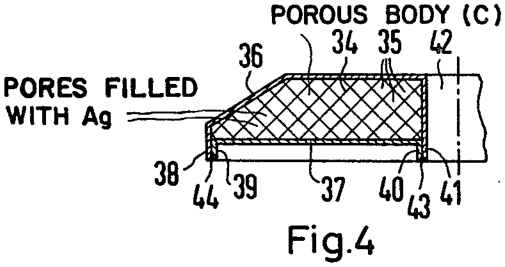
Fig.4
Fig. 5
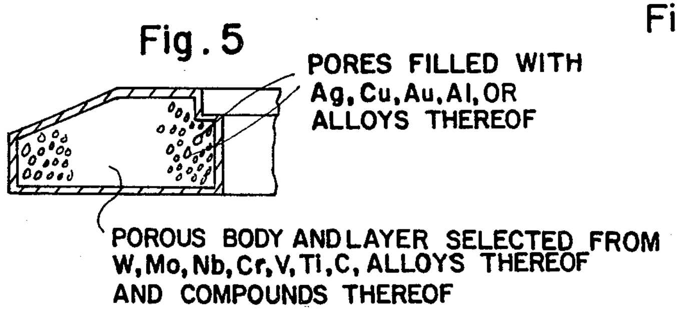

ROTATABLE ANODE FOR AN X-RAY TUBE COMPOSED OF A COATED, POROUS BODY

BACKGROUND OF THE INVENTION

1. Field of the Invention

The present invention is directed to a rotatable anode for an X-ray tube which is composed of a porous body of a difficult to melt material enclosed in a sealed fashion within an enveloping layer of difficult to melt material.

2. Prior Art

A rotatable anode for an X-ray tube which are frequently known and frequently employed are composed of a difficult to melt or fuse material and are, in addition, coated on the surface on which the electrons hit or impinge with a difficult to melt material having a high atomic number. An example of such an anode which has a porous body of a difficult to fuse material and is sealed within an enveloping cover is disclosed in U.S. Pat. No. 3,969,131.

Since, in the production of X-rays, all of the applied electrical energy except for approximately 1% is converted into heat, the structure must provide for a good dissipation or transport of the heat. A possibility of promoting the dissipation or transportation of the heat is accomplished by rotation of a known rotatable anode. In a rotatable anode, the electron beam is directed at a portion or segment of an annular surface which, due to the rotation of the anode, causes the surface on which the electron beam has been hitting to be moved out of the path of the electrons. While being conveyed away from the path of the electrons, the surface is able to emit heat to the surroundings by either radiation or thermal conduction. For this reason, the specific stress capacities or load carrying capacities of the X-ray tube with a rotatable anode is greater than in a tube which has a fixed or stationary anode.

In the case of anodes in accordance with the above-identified U.S. Pat. No. 3,969,131, the anode body is composed of a multi-layer construction with an isotropic graphite body which is provided with a coating adhering on its surfaces and sealing the latter. However, this constructive solution for adapting or adjusting the expansion coefficients, which solution is employed for the purpose of obtaining a thermally stable body, has not been capable of being introduced into X-ray technology because the heat transmission from the metal ring or coating into the multi-layer graphite section or body is insufficient.

SUMMARY OF THE INVENTION

The present invention is directed to providing a rotatable anode for an X-ray tube, which anode achieves greater stress or load carrying capacity and has an improved thermal stability, particularly with regard to the avoidance of thermal lag. To accomplish these tasks, a rotatable anode, which comprises a body composed of a porous, difficult to melt material, said body being enclosed in a sealed fashion within an envenlope layer of a difficult to melt material, has the improvement comprising said porous body being of a material having a good thermal conductivity and a good thermal capacity, said porous body having its pores filled with a filler material having a good thermal conductance and being a good conductor of heat.

In accordance with the present invention, a porous body is formed from a stable, high melting material which has been sintered and the pores of the porous body are filled with a metal having good thermal conductivity and/or thermal capacity. By encasing the porous body within a thin enveloping layer of a temperature stable, vacuum and electron-proof material, an anode, which exhibits the advantages of the stability of a heavy metal anode, is obtained. However, in addition, the anode has the favorable thermal properties of an anode manufactured from a material which is a good conductor of heat.

The sintered porous body may be composed of materials which are known in the technology of X-ray anodes. Preferably, these materials are selected from a group consisting of tungsten, molybdenum, niobium, chromium, vanadium, titanium, carbon such as graphite. In addition, the material may be selected of an alloy of tungsten, molybdenum, niobium, chromium, vanadium, titanium, and carbon, or the material may be selected from compounds of tungsten, molybdenum, niobium, chromium, vanadium, titanium and carbon with one another, such as carbides, or from compound of tungsten, molybdenum, niobium, chromium, vanadium, titanium and carbon with other hard to melt or fuse materials if these compounds exhibit sufficient mechanical and thermal stability. The filler material for the porous body is a material which has a thermal conductivity $\rho$, a density d and specific heat c of an order of magnitude to provide a value Z in a range of two to three times the value Z for tungsten and molybdenum wherein $z=\sqrt{d\cdot\rho\cdot c}$. Examples of these materials are metals selected from a group consisting of silver, gold, copper, aluminum, and alloys containing a predominant proportion of at least one of these elements.

In order to manufacture an anode in accordance with the present invention, a porous body is sintered to produce the anode body having a high porosity. For example, the porous body is obtained by sintering a granular material of the difficult to melt material. To provide for pores which may be filled with the thermally conductive storage material, as specified by the invention, suitable pore diameters can be obtained in the order of magnitude of $\mu$ to mm. The diameter range of approximately 10 to 100$\mu$ can be readily manufactured and are desirable. It is also possible to obtain the porous body having pores containing a filler material with the desired thermal conductivity and heat conductance by mixing the filler material in a powdered or granular form with the powder or granular material of the porous body, and then sintering the mixture to form a porous body containing the filler material having the desired properties of thermal conductivity. Such a body will exhibit a framework of a difficult to melt material which framework is filled with material which is more readily meltable but otherwise thermally more favorable.

A porous body, which has been manufactured by sintering the difficult to melt material, is subsequently filled with the desirable thermal absorption material, for example, by means of melting. In doing so, a difference in the thermal expansion capability between the material forming the body and the filler material must be taken into consideration and as a result, a portion of the porosity of the porous body will remain free of the filler material. By means of filling the pores of the porous body at an elevated temperature, which filling can also be designated as sub-impregnation or saturation of the body, it is possible to eliminate difficulties, which occur due to the different thermal expansion that will occur during the transition from a solid to a liquid phase of the filler material which exhibits a good thermal conduction.

The actual anode body manufactured in accordance with the above method was finally provided with an enclosing layer or cover which produces the electron impinging surface or target on the one hand and also acts to seal the body from the vacuum on the other hand. Materials entering into consideration for the coating or layer are those materials common in X-ray technology which are also employed as fundamental material of the porous body. They may be used in the form of sheet metal portions comprising a lid and container, which is fabricated with an internal size and shape to conform to the external size and shape of the porous body and will receive the porous body. After insertion of the porous body, the lid is applied and tightly welded to the container so that a hermetic seal of the porous body is achieved. Instead of forming two sheet metal parts which are joined together, the enveloping layer may be directly applied onto the anode body by coating or layering, for example by vapor deposition, chemical application (CVD) or plasma spraying. The enveloping layer can be formed by a combination of the two above-mentioned processes. For example, a portion of the surface of the porous body may be provided with the enveloping layer by means of the above mentioned coating or layering process, and the remaining surface is sealed off by means of a piece of sheet metal which is sealed by welding or soldering to the portion formed by the coating or layering process. In addition, it is advantageous to solder a graphite disk or plate onto a face or surface of the enveloping layer which surface faces away from the surface on which the electrons are impinged. As a rule, the enveloping layer or coating should have a thickness of at least 0.1 mm to ensure that the vacuum sealed state will be guaranteed. When utilizing sheet metal, the initial objects are that the coating or layer provides a properly sealed casing or envelope and is mechanically stable. When molybdenum is used as the enveloping layer, the thickness of the sheet metal is favorably at least 0.3 mm or greater. For welding the sheet metal parts together to form their thermetic seal or to weld the one part to the layer, a welding procedure such as the known electron beam welding may be employed. In addition to welding, soldering has also proved satisfactory for joining the parts together with a hermetic seal.

In producing the embodiments discussed hereinabove, the sheet metal container may be fabricated by reshaping or remodeling sheet metal. By a correct selection of the sintering temperature, a sintered framework or lattice consisting of sintered tungsten, molybdenum, niobium, chromium, vanadium, titanium, or alloys thereof may be obtained and have a porosity of 20 to 60% by volume. By immersion or application, a filler material, which has a good thermal conductivity such as a metal selected from a group of copper, aluminum, silver and gold, may be impregnated into the sintered body to fill the pores or spaces and leave a remaining unfilled porosity of less than 1% by volume. This unfilled porosity is necessary to accommodate thermal expansion and enlargement of the filler material. The saturated and impregnated sintered body which has been manufactured in the above-mentioned fashion is then assembled within the container and lid, which are hermetically sealed together such as by electron beam welding.

An anode structure in accordance with the present invention may also be obtained by using a porous body which was sintered in the manner described hereinabove, and by providing one side or exterior surface of the body with a coating or layer of heavy metal such as tungsten or molybdenum by means of plasma spraying, chemical or thermal deposition from a vapor phase. Consequently, the porous body is impregnated or saturated with the filler material, such as copper or silver, through an exposed exterior surface which was not coated during the coating process. Finally, the enveloping layer is completed by placing a sheet metal of a material such as molybdenum having a thickness of 0.3 mm or greater and welding the edges of the sheet metal member to the earlier applied coating or layer.

The sintered framework of a porous body composed of tungsten, molybdenum, or other of the above-mentioned materials can also be sealed by having most of the exterior surface fused by directing an electron beam of an electron beam welder onto the surface as the body is resting on a table or support. The still porous surface on the opposite side is then filled with the filler material having good thermal conduction according to the preceding mentioned procedures by means of impregnation through application or immersion. Finally, the remaining open surface of the porous body can be sealed with a sheet metal lid which is secured to the surfaces which have had their pores closed by a surface fusing procedure or the remaining open surface can be closed either by applying a coating or layer of closing material or by being fused closed by the above-mentioned welding process.

BRIEF DESCRIPITON OF THE DRAWINGS

FIG. 1 is a perspective view of an X-ray tube having a rotatable anode in accordance with the present invention with portions in cross section for purposes of illustration;

FIG. 2 is a partial cross section of a rotating anode illustrated in FIG. 1;

FIG. 3 is a partial cross section of a rotating anode whose envelope covering is formed from sheet metal parts; and FIG. 4 is a partial cross section of a modification of the embodiment of FIG. 3.

DESCRIPTION OF THE PREFERRED EMBODIMENT

The principles of the present invention are particularly useful in an X-ray tube generally indicated at 2 in FIG. 1. As illustrated, the X-ray tube 2 has a glass vacuum flask or tube 1 which surrounds the parts of the X-ray tube. In the glass vacuum tube or envelope 1, a cathode combination 3 and an anode combination generally indicated at 4 are positioned opposite one another in a known fashion. The cathode combination 3 consists of a support means 5 for a shielding casing 6 for a thermionic cathode (not illustrated) and is attached to one frontal wall of the glass envelope 1. An anode combination 4, which is conventional, consists of a rotor 7 having an axle 8 on which an anode plate 9 is mounted. The combination 4 can be set into rotation by means of a stator (not illustrated) which is placed against the exterior of the tube in the area of the rotor 7.

Anode plate 9 consists of a porous tungsten body 10, which, in accordance with the invention, is filled with silver and has an upper surface which is covered with a tungsten layer or coating 11 that has the thickness of at least 0.1 mm or greater. The opposite surface of the body 10 is provided with a lid 11', which is soldered together at its edges with the layer 11 to complete the enveloping layer or coating. The entire anode plate 9 is securely held in place under pressure on an abutment or counter-bearing 13 of axle 8 by means such as screw 12.

In order to produce X-rays, a high voltage is connected in a known fashion between one of the lines 14 and 15 and an anode connecting piece 16. The heating voltage for the thermionic cathode (not illustrated) is connected between lines 14 and 15 so that electrons in the form of a focal spot path or orbit will impinge on a portion of a surface 17. Due to the impacting of the electrons on the surface 17, the metal layer 11 is heated. This heat is conveyed on the boundary surface to the body 10 and will also be distributed or dissipated to the surroundings through radiation. As already stated hereinabove, on account of the saturation impregnation of the porous tungsten body with silver, there is an improved thermal capacity and an improved conductivity, which will cause an accelerated dissipation of the heat.

As best illustrated in FIG. 2, the porous body 10 will have a porous tungsten grid or a lattice illustrated by the lines 18 and the lattice forms intermediate spaces or pores 19 that are filled with silver. The layer 11, which consists of tungsten and is 0.5 mm thick, was applied by plasma spraying. A lower protective shield 11', which consists of a sheet of tungsten, is connected in a vacuum-tight fashion to the layer 11 at a lower edge by a weld seam 20 and at an interior upper edge, which will engage the axle 8 by a weld seam 21.

As illustrated in FIG. 3, a rotatable anode 9' has a porous body 33, which has a sintered tungsten framework or porous lattice 22, that has intermediate pores or spaces 23 having a diameter of 50μ. The spaces 23 are filled with copper. The sintered body 33 is enclosed within the enveloping layer which is formed of tungsten sheet metal container 31 and lid 32. The sheet metal container and lid have a wall thickness of 0.5 mm. The container 31 has an exterior flange 24 and an interior flange 28, which is coaxial with a passage 26 that receives the axle such as axle 8 of the X-ray tube 2. The lid 32 is provided with an exterior flange 25 and an interior flange 27 to cooperate with the flanges 24 and 28, respectively. The flanges 24 and 25 and the flanges 27 and 28 are cut off in a flush manner and welded together as indicated by welds 29 and 30, respectively. The welding procedure used is preferably an electron beam welding procedure. In view of welding sheet metal container 31 and lid 32 together, the porous body 33 is hermetically sealed within the enveloping layer.

In the embodiment illustrated in FIG. 4, a porous body of a difficult to melt material has a framework or lattice 34 and is composed of graphite. The framework or lattice 34 has pores 35, which are filled with silver. In this embodiment, a sheet metal container 36 and lid 37 are fabricated in the manner similar to the embodiment of FIG. 3 with the exception being that the connecting flanges such as 38 and 39 extend coaxially with the axis of the passage 42, which receives the axle 8 of the X-ray tube 2. As in the previous embodiment, the flanges 38 and 39 are sealed together by weld 44 and the interior flanges 40 and 41 are sealed together by welds 43 to hermetically seal the porous body within the enveloping layer. In view of the configuration of the flanges such as 38 and 39, the exterior surfaces have a flush configuration.

In order to promote thermal capacity and radiation, a disk or plate 45 of graphite having a thickness of approximately 10 mm may be soldered on a lower side of the enveloping layer. As illustrated in FIG. 3, the layer 45 is secured on the sheet metal lid or shell 32.

Although various minor modifications may be suggested by those versed in the art, it should be understood that we wish to employ within the scope of the patent warranted hereon, all such modifications as reasonably and properly come within the scope of our contribution to the art.

We claim:

1. A rotatable anode for an X-ray tube, said anode having an anode plate comprising a single body composed of a porous, difficult to melt material, said body being enclosed in a sealed fashion within an enveloping layer of difficult to melt material, a portion of said enveloping layer providing a target for impinging electrons, said porous body being of a material having a good thermal conductivity and a good thermal capacity, and said porous body having its pores filled with a filler material having a good thermal conductance and being a good conductor of heat.

2. A rotatable anode according to claim 1, wherein the enveloping layer consists of a sheet metal container and lid, said container having an internal size and shape conforming to the external size and shape of the porous body, and said lid being tightly sealed to said container.

3. A rotatable anode according to claim 1, wherein the enveloping layer comprises two portions, one portion being a layer tightly adhering to the porous body and the other of the two portions being a piece of sheet metal which is tightly sealed to the tightly adhering layer.

4. A rotatable anode according to claim 1, which further includes a disk of graphite soldered onto a side of the enveloping layer, said side being a side that faces away from the target for the impinging electrons.

5. A rotatable anode according to claim 1, characterized wherein the pores of the porous body have a diameter of a range of 10μ to 100μ.

6. A rotatable anode according to claim 1, wherein the material of the porous body and the material of the enveloping layer is selected from a group consisting of tungsten, molybdenum, niobium, chromium, vanadium, titanium, carbon, compounds of tungsten, molybdenum, niobium, chromium, vanadium, titanium, carbon with one another, and compounds of tungsten, molybdenum, niobium, chromium, vanadium, titanium, carbon with other difficult to melt materials, and wherein the filler material is a metal selected from a group consisting of silver, gold, copper, aluminum, and alloys containing not less than a predominant proportion of at least one of these metals.

* * * * *